US009420116B1

(12) United States Patent
Hamilton et al.

(10) Patent No.: US 9,420,116 B1
(45) Date of Patent: *Aug. 16, 2016

(54) PRIORITIZATION OF EMERGENCY CALLS

(71) Applicant: TRITECH SOFTWARE SYSTEMS, San Diego, CA (US)

(72) Inventors: Mark David Hamilton, San Diego, CA (US); Rochelle Rae Newsome, San Marcos, CA (US); Scott Michael MacDonald, Norfolk, MA (US); Paul L. Crosby, San Diego, CA (US); Chen-Lu Meng, San Diego, CA (US); Ken D. Martin, Golden, CO (US)

(73) Assignee: TRITECH SOFTWARE SYSTEMS, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/609,121

(22) Filed: Jan. 29, 2015

Related U.S. Application Data

(63) Continuation of application No. 13/752,709, filed on Jan. 29, 2013, now Pat. No. 8,976,939.

(51) Int. Cl.
*H04M 11/00* (2006.01)
*H04M 11/04* (2006.01)
*H04M 3/42* (2006.01)

(52) U.S. Cl.
CPC .......... *H04M 11/04* (2013.01); *H04M 3/42357* (2013.01); *H04M 2242/04* (2013.01)

(58) Field of Classification Search
CPC ............ H04M 2242/04; H04M 11/04; H04M 3/5116; H04M 2242/30; H04W 4/22; H04W 76/007; H04W 4/02

USPC ............................... 379/45; 455/404.1, 404.2
See application file for complete search history.

(56) References Cited

U.S. PATENT DOCUMENTS

| | | | |
|---|---|---|---|
| 6,370,234 B1 | 4/2002 | Kroll | 379/45 |
| 6,466,258 B1 | 10/2002 | Mogenis et al. | 348/143 |
| 6,563,910 B2 | 5/2003 | Menard et al. | 379/45 |
| 6,754,335 B1 | 6/2004 | Shaffer et al. | 379/266.02 |
| 7,031,714 B1 | 4/2006 | Rayburn | 455/455 |
| 7,302,250 B2 | 11/2007 | Chin et al. | 455/404.1 |
| 7,515,693 B2 | 4/2009 | Salafia et al. | 379/45 |
| 7,646,854 B2 | 1/2010 | Anderson | 379/45 |
| 7,646,858 B2 | 1/2010 | Salafia et al. | 379/201.01 |
| 7,991,124 B2 | 8/2011 | Anderson | 379/45 |
| 8,050,386 B2 | 11/2011 | Dickinson | 379/45 |
| 8,320,876 B2 * | 11/2012 | Shaffer et al. | 455/404.1 |
| 2002/0106059 A1 | 8/2002 | Kroll et al. | 379/45 |
| 2005/0215229 A1 | 9/2005 | Cheng | 455/404.1 |
| 2007/0003024 A1 | 1/2007 | Olivier et al. | 379/45 |
| 2007/0121799 A1 | 5/2007 | Binning | 379/37 |
| 2008/0267360 A1 | 10/2008 | Spector | 379/45 |
| 2008/0304629 A1 | 12/2008 | Buscemi et al. | 379/45 |
| 2010/0246781 A1 | 9/2010 | Bradburn | 379/45 |
| 2010/0291894 A1 | 11/2010 | Pipes | 455/404.2 |
| 2011/0151829 A1 | 6/2011 | Velusamy et al. | 455/404.2 |
| 2012/0045039 A1 | 2/2012 | Dickinson | 379/45 |
| 2014/0094134 A1* | 4/2014 | Balthasar et al. | 455/404.1 |

* cited by examiner

*Primary Examiner* — Stella L Woo
(74) *Attorney, Agent, or Firm* — Pillsbury Winthrop Shaw Pittman LLP (57) ABSTRACT

Systems and methods to prioritize emergency calls being placed to an emergency call center are based on geographical information, context information, and/or historical information associated with the emergency calls.

22 Claims, 3 Drawing Sheets

PRIORITIZATION OF EMERGENCY CALLS

FIELD OF THE DISCLOSURE

This disclosure relates to prioritizing incoming emergency calls and presented incoming emergency calls to an emergency operator in accordance with the determined priority.

BACKGROUND

Conventionally, emergency phone calls are answered by an emergency call center, such as, e.g., a public safety answering point (PSAP). Operators at emergency call centers, also referred to as emergency operators, dispatchers, or emergency dispatchers, may gather information during emergency calls, including, but not limited to, the name of the caller, the nature of the emergency, the location of the emergency, and/or other emergency information. Operators may determine the appropriate type of first response, including but not limited to police, fire, medical, and/or other types of first response. Operators may contact a dispatcher for the determined type, e.g. a police dispatcher, fire dispatcher, medical dispatcher, and/or other type of dispatcher. In turn, the police dispatcher may contact appropriate emergency responders, such as one or more police officers that are on duty and, e.g., near the location of the emergency.

SUMMARY

One aspect of the disclosure relates to a system configured to prioritize incoming emergency calls, preferably with very little delay. The prioritization may occur automatically. As used herein, the term "automatically" refers to the system's one or more operations or one or more accomplishments that occur and/or proceed without manual and/or human intervention. The system may be controlled and/or guided programmatically by its design and by virtue of the functionality of its components, as described herein. By obtaining and/or processing information associated with incoming emergency calls automatically, the opportunity for human operators to introduce errors and/or delays may be reduced, minimized, and/or removed. The system is configured to prioritize and/or respond rapidly to incoming emergency calls being placed to an emergency call center before such calls are answered.

In some implementations, the system may work with Automatic Call Distribution (ACD). In such cases, incoming emergency calls may be queued, optionally (re)ordered in accordance with priority considerations and/or determinations such as described in this disclosure, and distributed and/or routed to emergency operators for answering. Priority determinations may be based on information related to one or more incoming emergency calls, one or more emergency calls that are in the process of being answered by an emergency operator, one or more emergency calls that have been answered by an emergency operator, active computer-aided dispatch (CAD) events/incidents, and/or other information. For example, current incidents the system is aware of may contribute to the priority determinations.

The system may be hosted by and/or implemented on one or more servers. Callers, operators, dispatchers, and/or emergency responders may interact and/or communicate with and/or through the system. Interaction and/or communication may be implemented by telephones, electronic devices, communication devices, client computing platforms and/or servers. Interaction and/or communication with the system may be implemented over one or more networks, including, but not limited to, wired telephone networks, wireless telephone networks, the internet, and/or other networks.

The system may include one or more of one or more servers, one or more emergency call centers, and/or other components. The server(s) may be configured to communicate according to a client/server architecture, and/or according other architectures. Callers, operators, dispatchers, and emergency responders may be referred to as users of the system. Users may access the system via landlines, wired telephones, wireless telephones, smartphones, electronic devices, communication devices, client computing platform(s), and/or other devices or combinations thereof, jointly referred to herein as client devices. Callers may generate emergency calls via landlines, wired telephones, wireless telephones, smartphones, electronic devices, communication devices, client computing platform(s), and/or other devices or combinations thereof, jointly referred to herein as emergency calling devices.

The server(s) may include electronic storage, one or more processors, and/or other components. The server(s) may be configured to execute one or more computer program modules. The computer program modules may include one or more of a call monitor module, a location module, a context module, a priority module, a presentation module, a history module, and/or other modules.

The call monitor module may be configured to monitor incoming emergency calls being placed to an emergency call center. Emergency calls may be produced, generated and/or originated by callers using emergency calling devices. The call monitor module may be configured to monitor an emergency call before the emergency call center personnel answers the emergency call. The call monitor module may be implemented, embedded, combined, and/or integrated with one or more emergency call centers to accomplish the functions attributed in this disclosure to the call monitor module. The incoming emergency calls may include a first call, a second call, a third call, and so forth.

Emergency calls may be associated with different types of emergency information, including, but not limited to, subscriber information, household information, location-based information, one or more types of emergency, historical emergency information, and/or other information. Such information may have been gathered and/or processed in advance of an emergency call, for example through one or more databases that correlate telephone numbers and residence addresses. For example, subscriber information may include identification of the caller, such as, by way of non-limiting example, a telephone number, an IP address, information from one or more radio towers used in establishing the call, a billing address, a residence address, and/or other information.

Emergency calls may be text-based and/or turn-based, such as a text message, voicemail, video message, email (conversations), and/or other text-based and/or turn-based communication. For the purposes of this disclosure, a conversation using text-based or turn-based communication may be regarded as a single emergency call.

The location module may be configured to obtain and/or determine locations associated with incoming emergency calls. The locations may include geographical locations such as (physical) addresses, city blocks, a particular area, and/or other locations. Information related to location may be received from an emergency calling device generating an emergency call. Operation of the location module may be based on any emergency information associated with an incoming emergency call. Operation of the location module may be responsive to an emergency call being placed to the emergency call center. Operation of the location module may occur prior to an emergency call being distributed to and/or answered at emergency call center. A first (geographical) location may be associated with the first call; a second (geographical) location may be associated with the second call, and so forth.

The context module may be configured to obtain context information associated with the incoming emergency calls. Context information may describe the context in which an incoming emergency calls is placed. Context information may be based, at least in part, on geographical locations obtained by the location module and/or other geographical information. Context information of a particular call may include information regarding events and/or objects within a predetermined distance of the geographic location associated with the particular call, and/or other information.

Some context information may be of a (semi) permanent type. For example, the (semi) permanent context information may pertain to the proximity of objects, including, by way of non-limiting example, geographical landmarks, roads, bus stations, train stations, railroads, railroad crossings, and bridges. A call may be treated and/or handled with a higher priority if the associated geographical location is near a railroad crossing, a bridge, an address and/or location tagged and/or renowned for being dangerous, accident-prone, and/or otherwise a noteworthy location in the context of emergency calls. These qualifications for geographical locations may be permanent or semi-permanent, which may mean the qualifications only change gradually and/or slowly, if at all. Furthermore, such qualifications may be known in advance of any incoming emergency calls being placed to the emergency call center.

Some context information may be of a transient type, which may be referred to as real-time information. For example, the transient context information may pertain to the proximity of events, including, by way of non-limiting example, sporting events, holiday activities, festivals, concerts, parades, and/or other planned events. Planned events may include public transportation, as expected according to the bus or train schedule. Events may include emergencies, including but not limited to car accidents, fires in progress, criminal activity, and/or other unforeseeable events or events unknown or unplanned by the public. For example, a call may be treated and/or handled with a lower priority if the associated geographical location is the scene of a previously reported car accident and police is already present or on the way). Such a call is likely to be a duplicate reporting of an emergency that is already being handled. Depending on the characteristics of the emergency, (expected or likely) duplicate reporting of an emergency may be a reason to lower the priority of a particular emergency call.

The context information associated with an incoming emergency call may be referred to as a set of context information. A first set of context information may be associated with a first call that describes a first context in which the first call is placed; a second set of context information may be associated with a second call that describes a second context in which the second call is placed, and so forth.

The priority module may be configured to determine a priority for incoming emergency calls. The determined priority (interchangeably referred to herein as priority information) may be used to control presentation to emergency operators. The determination of priority may be based on context information. For example, responsive to a first call and a second call being placed to the emergency call center, a relative priority between the first call (having a first set of context information) and the second call (having a second set of context information) may be determined. The determined relative priority may be used to control presentation to an emergency operator. The determination of the relative priority may be based on the first set of context information and the second set of context information. Through the context information, the determined priority may be based, by way of non-limiting example, on geographic information, active computer-aided dispatch (CAD) events/incidents, and/or other information associated with incoming emergency calls.

The presentation module may be configured to present incoming emergency calls to emergency operators. Such presentations may be in accordance with priorities determined by the priority module. For example, responsive to a first call and a second call being placed to the emergency call center, the first call and second call may be presented to an emergency operator in accordance with a relative priority determined by the priority module. In some implementations, a queue or ordered list of incoming emergency calls may only partially be presented to emergency operators. For example, in fully automated systems, only the incoming call having the highest determined priority may be presented to an individual emergency operator.

The history module may be configured to obtain historical information associated with the incoming emergency calls. In some implementations, context information (and thus priority) may be based on historical information from the history module. In some implementations, historical information may include information related to one or more of previous emergency calls from the same emergency calling device, the same caller, the same or similar location, related emergency calling devices and/or client devices, related callers, and/or other information. For example, a single caller may have multiple telephones with different phone numbers. For example, a group of callers may live at the same address. These examples are not intended to be limiting in any way. Other types of relations between emergency calling devices, callers, locations, etc. are contemplated within the scope of this disclosure.

The historical information associated with an incoming emergency call may be referred to as a set of historical information. A first set of historical information may be associated with a first call; a second set of historical information may be associated with a second call, and so forth.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
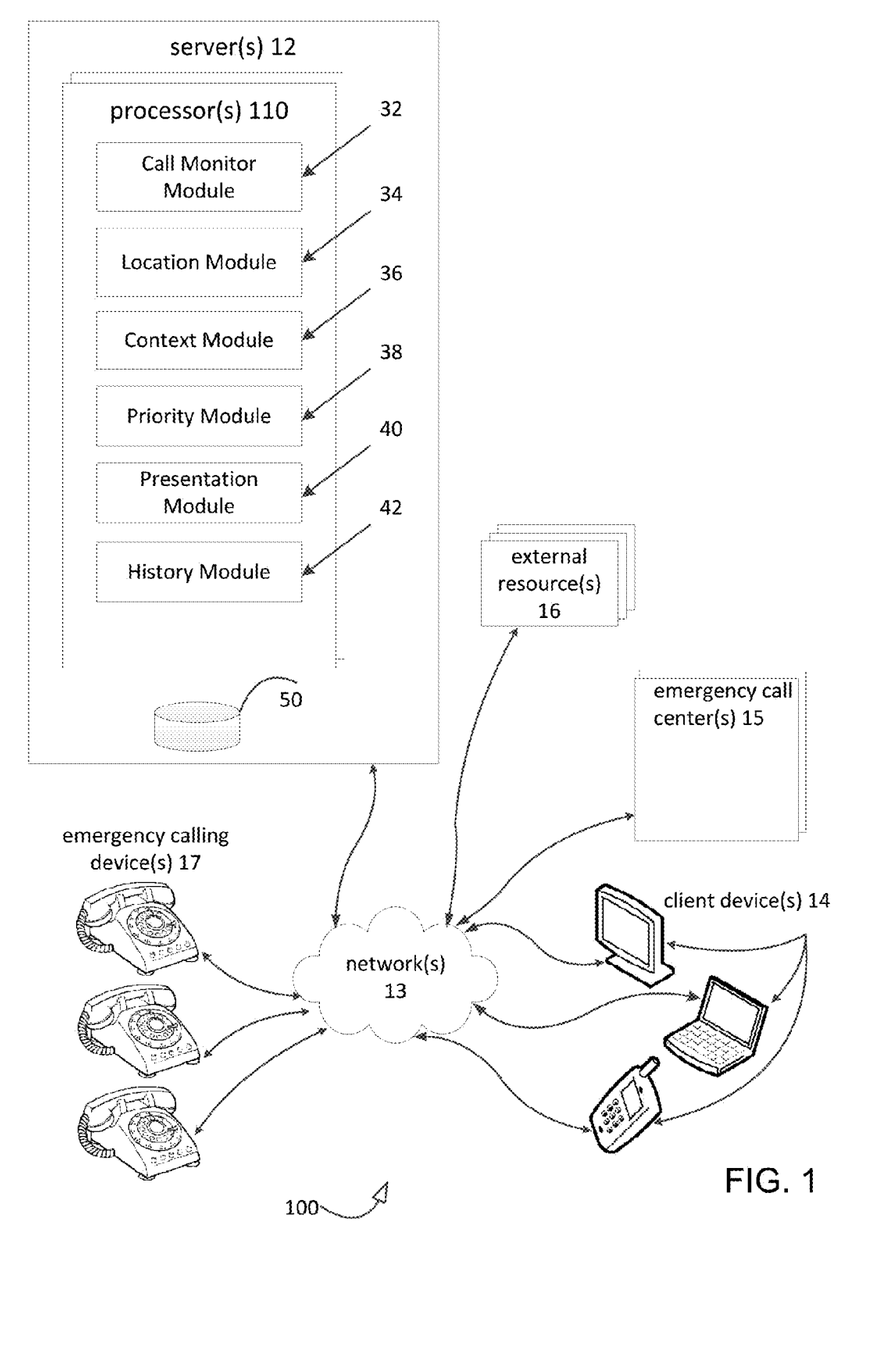
FIG. 1 illustrates a system configured to prioritize incoming emergency calls, in accordance with one or more implementations.

FIG. 1 illustrates a system 100 configured to prioritize incoming emergency calls, in accordance with one or more implementations. System 100 may include one or more servers 12, one or more emergency call centers 15, one or more client devices 14, one or more emergency calling devices 17, and/or other components.

Server(s) 12 may be configured to communicate with one or more client devices 14 and/or one or more emergency calling devices 17 according to a client/server architecture. Components of system 100 may communicate over one or more networks 13. Communication may use techniques including, but not limited to, wired, wireless, and/or combinations thereof. In some implementations, system 100 may include communication using a peer-to-peer architecture. Users may access system 100 via client device(s) 14, emergency calling device(s) 17, and/or other devices.

Server(s) 12 may include electronic storage 50, one or more processors 110, and/or other components. Server(s) 12 may include communication lines, or ports to enable the exchange of information with one or more networks 13 and/or other computing platforms. Illustration of server(s) 12 in FIG. 1 is not intended to be limiting. Server(s) 12 may include a plurality of hardware, software, and/or firmware components operating together to provide the functionality attributed herein to server(s) 12. For example, server(s) 12 may be implemented by a cloud of computing platforms operating together as server(s) 12.

In some implementations, server(s) 12, client device(s) 14, emergency calling device(s) 17, and/or external resources 16 may be operatively linked via one or more electronic communication links. For example, such electronic communication links may be established, at least in part, via one or more networks 13, including, e.g., the internet, a telephone network, and/or other networks. It will be appreciated that this is not intended to be limiting, and that the scope of this disclosure includes implementations in which server(s) 12, client device(s) 14, emergency calling device(s) 17, and/or external resources 16 may be operatively linked via some other communication media.

External resources 16 may include sources of information, hosts and/or providers of communication systems outside of system 100, external entities participating with system 100, and/or other resources. In some implementations, some or all of the functionality attributed herein to external resources 16 may be provided by resources included in system 100.

Server(s) 12 may be configured to execute one or more computer program modules. The computer program modules may include one or more of a call monitor module 32, a location module 34, a context module 36, a priority module 38, a presentation module 40, a history module 42, and/or other modules.

Call monitor module 32 may be configured to monitor incoming emergency calls being placed to an emergency call center 15. Emergency calls may be associated with different types of emergency information. Emergency calls may be produced, generated, and/or originated by callers using emergency calling devices 17. Call monitor module 32 may be configured to monitor an emergency call before emergency call center 15 answers the emergency call. Call monitor module 32 may be implemented, embedded, combined, and/or integrated with one or more emergency call centers 15 to accomplish the functions attributed in this disclosure to call monitor module 32.

In some implementations, call monitor module 32 may be configured to monitor incoming emergency calls directly and/or before the calls enter and/or engage with an (operator at an) emergency call center 15. In some implementations, call monitor module 32 may be configured to obtain access to incoming emergency calls and/or monitor incoming emergency calls before, during, and/or after an (operator at an) emergency call center 15 engages with an incoming emergency call. The incoming emergency calls may include a first call, a second call, a third call, and so forth.

Location module 34 may be configured to obtain and/or determine locations associated with incoming emergency calls. The locations may include geographical locations such as (physical) addresses, city blocks, a particular area, and/or other locations. Information may have been gathered and/or processed in advance of a particular emergency call, for example through one or more databases that correlate telephone numbers and residence/billing addresses. Information related to location may be received from emergency calling device 17 generating an emergency call. Such information may include geo-location information determined on the emergency calling device (e.g., global positioning system information, cell tower triangulation information, pseudo-location information, and/or other information). In some implementations, information relatedto location may be based on phase 1 type cellular information, phase 2 type cellular information, and/or other cellular information.

Information related to location may be obtained from one or more external resources 16. For example, location module 34 may be configured to query an external database using the telephone number associated with the emergency calling device generating the emergency call. The external database may store associations between telephone numbers and residential addresses. The operation of location module 34 may be based on any emergency information associated with the emergency call. Determinations by location module 34 may be responsive to an emergency call being placed to emergency call center 15. Determinations by location module 34 may be made prior to such an emergency call being answered at emergency call center 15. A first (geographical) location may be associated with a first incoming emergency call; a second (geographical) location may be associated with a second incoming emergency call, and so forth.

In some implementations, location module 34 may be configured to determine, estimate, and/or derive a level of accuracy that is associated with an obtained or determined location. The level of accuracy may account for the different granularity and/or accuracy associated with different types of sources of location information. For example, the address information associated with a landline telephone number is expected to be a highly accurate type of location information, and/or expected to vary in a small range or within a short distance from a particular address. For example, cell tower triangulation information or other pseudo-location information associated with a cellphone is expected to be a moderately accurate type of location at best, and/or expected to vary in a greater range or within a greater distance from a particular estimated location. Depending on the density of communicating cell towers in a particular area, the accuracy may vary. Distances or ranges may be about 10 feet, about 50 feet, about 100 feet, about 300 feet, about 500 feet, about a city block, about a quarter mile, about a half mile, about a mile, and/or other distances.

Context module 36 may be configured to obtain context information associated with the incoming emergency calls. Context information may describe the context in which an incoming emergency calls is placed. Context information may be based, at least in part, on geographical locations obtained by location module 34 and/or other geographical information. Context information of a particular call may include information regarding events, incidents, and/or objects within a predetermined distance of the geographic location associated with the particular call, and/or other information. Note that such information regarding events, incidents, and/or objects may include information related to active CAD events/incidents. In some implementations, such information regarding events, incidents, and/or objects may include information that is not obtained through emergency calls, but, rather, obtain from other information sources.

Some context information may be of a (semi) permanent type. For example, the (semi) permanent context information may pertain to the proximity of objects, including, by way of non-limiting example, geographical landmarks, roads, bus stations, train stations, railroads, railroad crossings, and bridges. A call may be treated and/or handled with a higher priority if the associated geographical location is near a railroad crossing, a bridge, an address and/or location tagged and/or renowned for being dangerous, accident-prone, and/or otherwise a noteworthy location in the context of emergency calls. These qualifications for geographical locations may be permanent or semi-permanent, which may mean the qualifications only change gradually and/or slowly, if at all. Such qualifications may be known in advance of any incoming emergency calls being placed to emergency call center 15.

Some context information may be of a transient type, which may be referred to as real-time information. For example, the transient context information may pertain to the proximity of events, including, by way of non-limiting example, sporting events, holiday activities, festivals, concerts, parades, and/or other planned events. Planned events may include public transportation, as expected according to the bus or train schedule. Events may include emergencies, including but not limited to car accidents, fires in progress, criminal activity, and/or other unforeseeable events or events unknown or unplanned by the public.

For example, a call may be treated and/or handled with a lower priority if the associated geographical location is the scene of a previously reported car accident (assuming no injuries are reported and police is already present or on the way). Such a call is likely to be a duplicate reporting of an emergency that is already being handled. Depending on the characteristics of the emergency, (expected or likely) duplicate reporting of an emergency may be a reason to lower the priority of a particular emergency call.

For example, a call may be treated and/or handled with a high priority if the associated geographical location is near a railroad crossing and the context information indicates a train is scheduled to pass that railroad crossing within a predetermined period from the moment the incoming call is placed. Such a scenario may e.g. indicate some sort of train accident. The predetermined period may be context-specific. Periods may range from about 1 minute, about 5 minutes, about 10 minutes, about 30 minutes, about an hour, and/or about a suitable period in light of the particular event type.

The context information associated with an incoming emergency call may be referred to as a set of context information. A first set of context information may be associated with a first call that describes a first context in which the first call is placed; a second set of context information may be associated with a second call that describes a second context in which the second call is placed, and so forth.

In some implementations, context information may be updated and/or changed as additional and/or improved information regarding an event becomes available. For example, a car accident may initially be reported as having no personal injuries. As more information becomes available, the context information for this particular car accident may be updated to reflect how many people were injured and/or how serious any injuries are. Determined priorities may be updated accordingly.

Priority module 38 may be configured to determine a priority for incoming emergency calls. The determined priority may be used to control presentation to emergency operators. The determination of priority may be based on context information. For example, responsive to a first call and a second call being placed to emergency call center 15, a relative priority between the first call (having a first set of context information) and the second call (having a second set of context information) may be determined. The determined relative priority may be used to control presentation to an emergency operator. The determination of the relative priority may be based on the first set of context information and the second set of context information. Through the context information, the determined priority may be based, by way of non-limiting example, on information associated with incoming emergency calls, calls in the process of being answered, completed calls, and/or active CAD events/incidents. Operation of priority module 38 may be based on information from any other module in system 100.

Presentation module 40 may be configured to present incoming emergency calls to emergency operators. Such presentations may be in accordance with priorities determined by priority module 38. For example, responsive to a first call and a second call being placed to emergency call center 15, the first call and second call may be presented to an emergency operator in accordance with a relative priority determined by priority module 38.

Presentation module 40 may be configured to present, display, render, generate, and/or implement (hereinafter referred to as "present" or a "presentation of") user interfaces for users (including but not limited to emergency operators at emergency call center 15) to interact with system 100.

Presentation module 40 may be configured to present interfaces through client devices 14 and/or to one or more emergency call centers 15. User interfaces may be provided to users. Presentation module 40 may be configured to receive one or more inputs (e.g. control inputs and/or command inputs) from an individual user that affect presentation of an individual user interface. The user interface may present an offered set of user-selectable options for the presentation of incoming emergency calls, priority information, emergency information, location information, context information, historical information, and/or other information. The received inputs may include one or more selections from the offered set of user-selectable options. Alternatively, and/or simultaneously, a user interface may provide other ways for users to affect the presentation, including, but not limited to, textual input, touch screen gestures, pointer device input, and/or other ways for users to affect the presentation.

History module 42 may be configured to obtain historical information associated with the incoming emergency calls. In some implementations, context information (and thus priority) may be based on historical information from history module 42. In some implementations, historical information may include information related to one or more of previous emergency calls from the same emergency calling device, the same caller, the same or similar location, related emergency calling devices and/or client devices, related callers, active or formerly active CAD events/incidents, and/or other information. For example, a single caller may have multiple telephones with different phone numbers. For example, a group of callers may live at the same address. These examples are not intended to be limiting in any way. Other types of relations between emergency calling devices, callers, locations, etc. are contemplated within the scope of this disclosure. For example, if a particular caller has called on one or more previous occasions regarding a particular disturbance (by way of non-limiting example, a previous occasion may be related to domestic abuse) that involved one or more particular people, information to that effect may be included in the history information and/or the context information.

In some implementations, historical information may include personal information associated with an emergency call. Personal information may include one or more names, ages, gender, and/or other personal information associated with a caller, a registered user for a particular telephone number, a registered resident at a particular (billing) address, and/or other people.

In some implementations, historical information may include a call frequency associated with the same emergency calling device, the same caller, the same or similar location, related emergency calling devices and/or client devices, related callers, and/or other information. In some implementations, historical information may include one or more emergency types associated with the same emergency calling device, the same caller, the same or similar location, related emergency calling devices and/or client devices, related callers, and/or other information. By way of non-limiting example, emergency types may include prank calls, domestic violence, drug overdoses, and/or other types of emergency. Historic information may be used by the priority module to determine priority.

The historical information associated with an incoming emergency call may be referred to as a set of historical information. A first set of historical information may be associated with a first call; a second set of historical information may be associated with a second call, and so forth.

Users may interact with system 100 through client devices 14, emergency calling devices 17, and/or other devices. For example, interaction may be controlled through control inputs and/or commands input by the users through client devices 14 and/or emergency calling device(s) 17. By way of non-limiting example, input from users may be entered using interface devices including, but not limited to, a telephone, a keypad, buttons, switches, a keyboard, knobs, levers, a display screen, a touch screen, speakers, a microphone, an indicator light, an audible alarm, a printer, and/or any combinations thereof. By way of non-limiting example, client devices 14 and/or emergency calling devices 17 may include one or more of a desktop computer, a laptop computer, a handheld computer, a NetBook, a tablet, a Smartphone, a gaming console, and/or other computing platforms. Note that the depictions of devices and/or icons used in FIG. 1 are not intended to be limiting in any way. For example, a cellphone could be an emergency calling device 17.

Figure 3:
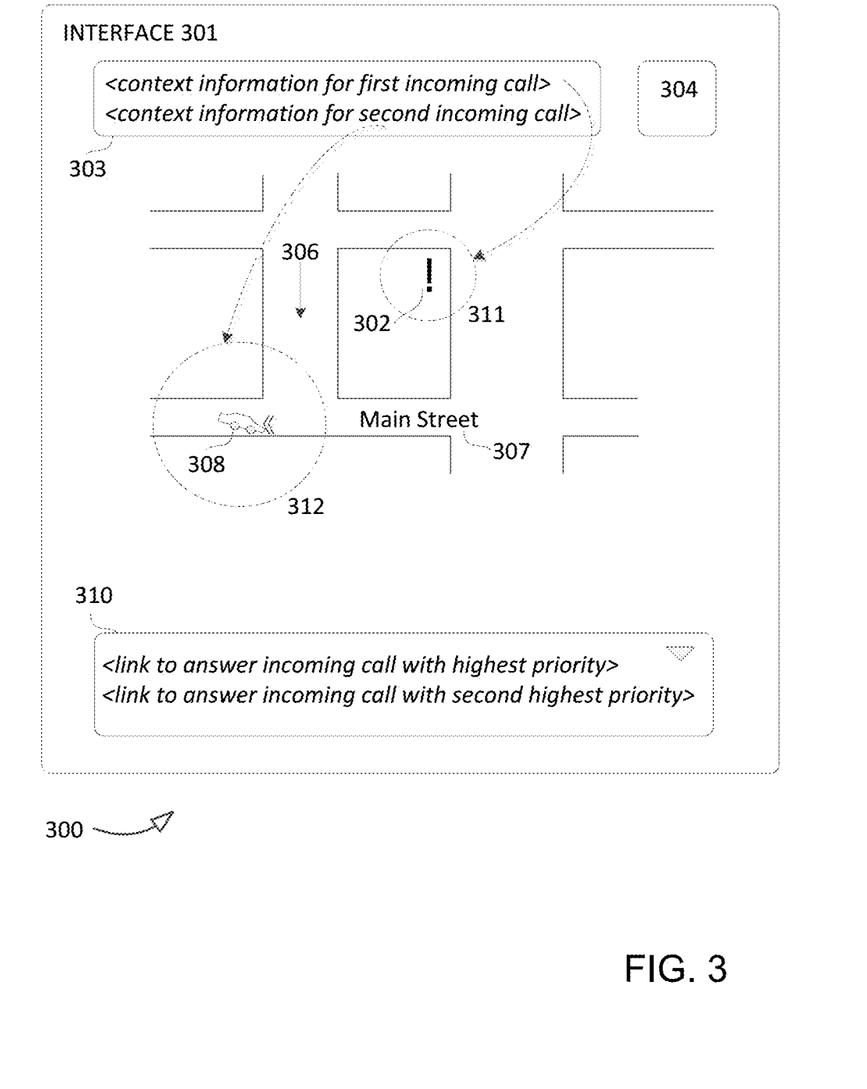
FIG. 3 illustrates a view of an exemplary interface in accordance with one or more implementations.

By way of illustration, FIG. 3 illustrates a view 300 of a user interface 301 as presented to a particular emergency operator. User interface 301 may be presented through a client device. User interface 301 may be presented in response to one or more emergency calls being placed to and/or being handled by an emergency call center. These emergency calls may be referred to as the first and second emergency calls in reference to FIG. 3, or first and second call for short. Elements of user interface 301 may be implemented as fields configured to receive entry, selection, and/or confirmation from a user. The fields may include one or more of a text entry field, a set of selectable menu items, a selectable field, and/or other fields configured to receive entry, selection, and/or confirmation from the emergency operator. The number of elements, components, and/or (user-selectable) fields depicted in FIG. 3 is meant to be exemplary, and not limiting in any way. User interface 301 may be configured to present information to and/or enable interaction with the emergency operator viewing view 300.

User interface 301 of FIG. 3 may include a first icon 302, a second icon 308, location information 307 and 306, emergency-specific interface elements 303 and 304, priority-specific interface element 310, a first perimeter 311, a second perimeter 312, and/or other components or features. An area of user interface 301, e.g. the center as shown in FIG. 3, may schematically depict a map of a particular geographical area, in particular an area relevant to the first and second call. For example, the map may include streets and location information 307 and 306. For example, location information 307 may be a street name. For example, location information 306 may indicate street attributes, such as a one-way street. Location information 306 may be updated dynamically, for example to reflect traffic conditions, roadblocks, real-time information, etc.

First icon 302 may indicate and/or represent a determined location of the first call. First icon 302 may indicate and/or represent a determined, obtained, estimated, or expected type of the first call. For example, first icon 302 may have a particular color, shape, size, and/or graphically distinguishable characteristic such that the emergency operator may rapidly obtain relevant information about the first call. For example, first icon 302 may indicate a particular type of altercation in progress. Emergency-specific interface elements 303 and 304 may include an object, interface, and/or other items that the emergency operator viewing user interface 301 may interact with, such as a menu of user-selectable options and/or actions for engaging the system. For example, emergency-specific interface element 303 may display a name and/or address (or any other emergency information) associated with the first or second call. For example, emergency-specific interface element 304 may indicate an emergency type, context information, historical information, and/or other information pertaining to one or more incoming emergency calls.

Second icon 308 may indicate and/or represent a determined location of the second call. Second icon 308 may indicate and/or represent a determined, obtained, estimated, or expected type of the second call. Second icon 308 may have a particular color, shape (e.g. of a car), size, and/or graphically distinguishable characteristic such that the emergency operator may rapidly obtain relevant information about the second call. As depicted in FIG. 3, second icon 308 may represent a car involved in a particular type of car accident.

First perimeter 311 may indicate the estimated level of accuracy of the determined location of the first call. Second perimeter 312 may indicate the estimated level of accuracy of the determined location of the second call. The difference in the size of first perimeter 311 and second perimeter 312 may be based on the origination type of emergency call. For example, the first call may be placed from a landline telephone, whereas the second call may be placed from a cell phone.

By virtue of the technology described herein, a priority may be determined between the first and second call. Priority-specific interface element 310 may for example include one or more objects that the emergency operator viewing user interface 301 may interact with, such as a menu of user-selectable options and/or actions for engaging the system. In some implementations, interface element 310 may be a list of (links to answer) the incoming emergency calls. The list may be ordered according to the determined priority. In some implementations, interface element 310 may only include the incoming emergency call having the highest priority. For example, the emergency operator may select, through interface element 310, to answer the call having the top priority first, or, if made available to the emergency operator, to answer another call first.

The depiction and description regarding FIG. 3 of two incoming emergency calls is not intended to be limiting in any way. Priorities may be determined between any plurality of incoming emergency calls. Priorities may be based, by way of non-limiting example, on comparisons between incoming emergency calls, known emergencies, emergency calls in the process of being answered by an emergency operator, active CAD events/incidents, and/or other information. Referring to FIG. 1, in some implementations, system 100 may be configured to automatically answer the incoming emergency call having the highest priority as determined by a priority module.

Referring to FIG. 1, server(s) 12, client device(s) 14, and/or emergency calling devices 17 may include electronic storage 50. Electronic storage 50 may comprise electronic storage media that electronically stores information. The functionality of electronic storage 50 may be similar between different instantiations, even if the stored information may be different. The electronic storage media of electronic storage 50 may include one or both of system storage that is provided integrally (i.e., substantially non-removable) and/or removable storage that is removably connectable to server(s) 12 and/or client device(s) 14 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 50 may include one or more virtual storage resources (e.g., cloud storage, a virtual private network, and/or other virtual storage resources). Electronic storage 50 may store software algorithms, information determined by processor(s) 110, information received from components of system 100, and/or other information that enables server(s) 12 and/or client device(s) 14 to function as described herein.

Server(s) 12 and client device(s) 14 may include processor(s) 110. Processor(s) 110 may be configured to provide information processing capabilities in server(s) 12 and/or client device(s) 14. The functionality of processor(s) 110 may be similar between different instantiations, even if the processing capabilities may be different. Processor(s) 110 may include one or more of a digital processor, an analog processor, a digital circuit designed to process information, an analog circuit designed to process information, and/or other mechanisms for electronically processing information. Although processor(s) 110 is shown in FIG. 1 as a single entity, this is for illustrative purposes only. In some implementations, processor(s) 110 may include a plurality of processing units. These processing units may be physically located within the same device, or processor(s) 110 may represent processing functionality of a plurality of devices operating in coordination. The processor(s) 110 may be configured to execute modules 32-42, and/or other modules. Processor 110 may be configured to execute modules 32-42, and/or other modules by software; hardware; firmware; some combination of software, hardware, and/or firmware; and/or other mechanisms for configuring processing capabilities on processor(s) 110.

It should be appreciated that although modules 32-42 are illustrated in FIG. 1 as being co-located within a single processing unit, in implementations in which processor(s) 110 includes multiple processing units, one or more of modules 32-42 may be located remotely from the other modules. The description of the functionality provided by the different modules 32-42 described below is for illustrative purposes, and is not intended to be limiting, as any of modules 32-42 may provide more or less functionality than is described. For example, one or more of modules 32-42 may be eliminated, and some or all of its functionality may be provided by other ones of modules 32-42. As another example, processor 110 may be configured to execute one or more additional modules that may perform some or all of the functionality attributed herein to one of modules 32-42.

It is noted that the division of functionality between server(s) 12 and client device(s) 14 is not intended to be limited by this disclosure. Functions described in relation with server(s) 12 may be performed and/or shared by one or more other components of system 100, including client device(s) 14, and/or vice versa.

Figure 2:
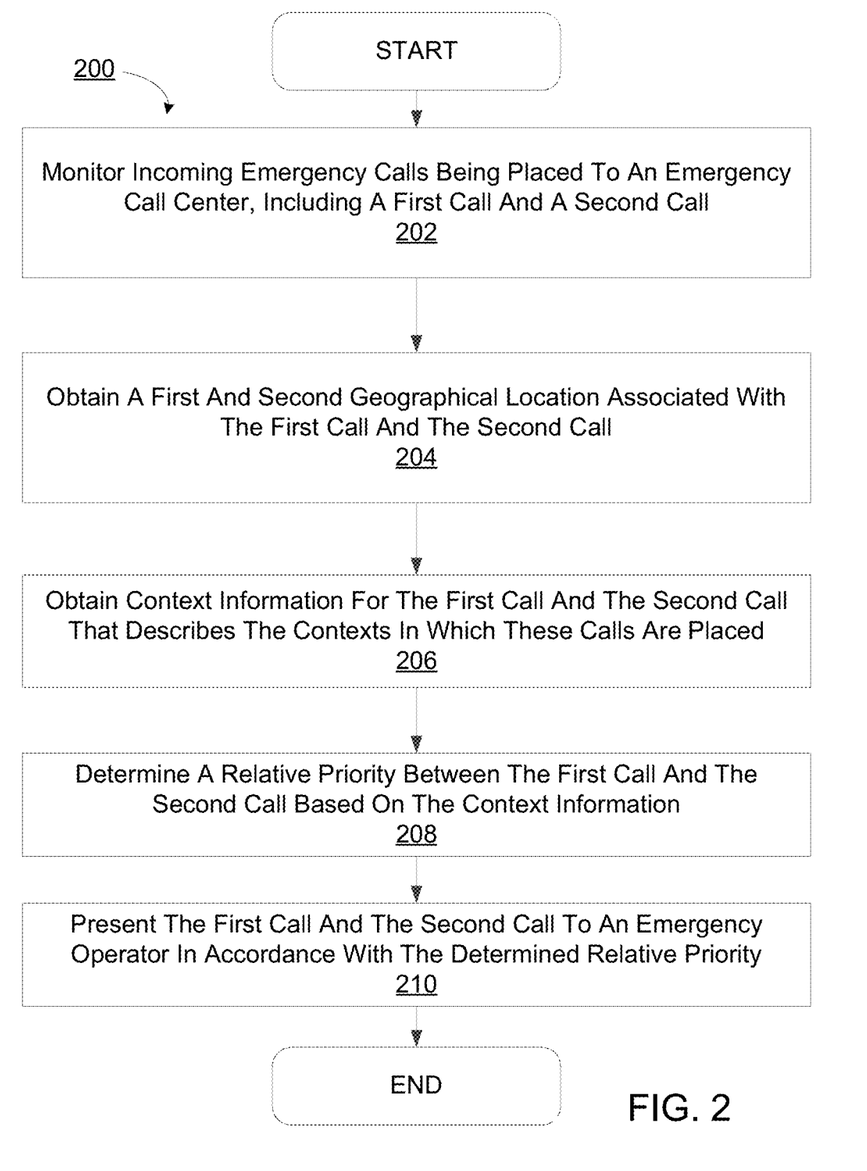
FIG. 2 illustrates a method to prioritize incoming emergency calls, in accordance with one or more implementations.

FIG. 2 illustrates a method 200 for prioritizing incoming emergency calls, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, incoming emergency calls being placed to an emergency call center are monitored, wherein the emergency calls include a first call and a second call. In some embodiments, operation 202 is performed by a call monitor module the same as or similar to call monitor module 32 (shown in FIG. 1 and described herein).

At an operation 204, a first geographical location associated with the first call and a second geographical location associated with the second call are obtained. In some embodiments, operation 204 is performed by a location module the same as or similar to location module 34 (shown in FIG. 1 and described herein).

At an operation 206, context information associated with the incoming emergency calls is obtained that describes the contexts in which the incoming emergency calls are placed. The context information is based on geographical locations. The context information includes a first set of context information associated with the first call and a second set of context information associated with the second call. In some embodiments, operation 206 is performed by a context module the same as or similar to context module 36 (shown in FIG. 1 and described herein).

At an operation 208, a relative priority between the first call and the second call for presentation to an emergency operator is determined, responsive to the first call and the second call being placed to the emergency call center. The relative priority is based on the first and second set of context information. In some embodiments, operation 208 is performed by a priority module 38 the same as or similar to priority module 38 (shown in FIG. 1 and described herein).

At an operation 210, the first call and second call are presented, responsive to the first call and the second call being placed to the emergency call center, to an emergency operator in accordance with the determined relative priority. In some embodiments, operation 210 is performed by a presentation module the same as or similar to presentation module 40 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to prioritize incoming emergency calls to an emergency call center, the system comprising:
   one or more hardware processors configured by machine-readable instructions to obtain geographical location information associated with incoming emergency calls such that, responsive to a first call being placed to the emergency call center by a first caller, a first geographical location is associated with the first call, and such that, responsive to a second call being placed to the emergency call center by a second caller, a second geographical location is associated with the second call; and
   determine relative priority information regarding the first call and the second call based on the first geographical location and the second geographical location;
   wherein determining the relative priority information includes comparing the first geographical location of the first call and the second geographical location of the second call with one or more geographical locations associated with one or more emergency calls that (1) have been answered by the emergency call center and/or (2) are in the process of being answered by the emergency call center; and
   wherein an external database is queried, the database storing associations between telephone numbers and addresses.

2. The system of claim 1, wherein the one or more hardware processors are further configured by machine-readable instructions to:
   present the first call and the second call to one or more emergency operators at the emergency call center in accordance with the determined relative priority information.

3. The system of claim 1, wherein the one or more hardware processors are further configured by machine-readable to:
   obtain a first set of context information associated with the first call and a second set of context information associated with the second call;
   wherein determination of the relative priority information is further based on the first set of context information and the second set of context information.

4. The system of claim 3, wherein the first set of context information includes information regarding proximity between the first geographical location and one or more of a geographical landmark, a road, a railroad, and/or a bridge.

5. The system of claim 3, wherein the first set of context information includes information regarding proximity between the first caller and one or more of a geographical landmark, a road, a railroad, and/or a bridge.

6. The system of claim 3, wherein the one or more hardware processors are further configured by machine-readable instructions to:
   obtain historical information associated with the incoming emergency calls such that, responsive to the first call being placed to the emergency call center, the history module obtains a first set of historical information is associated with the first call, and such that, responsive to the second call being placed to the emergency call center, a second set of historical information is associated with the second call;
   wherein the first set of context information includes at least a portion of the first set of historical information; and
   wherein the second set of context information includes at least a portion of the second set of historical information.

7. The system of claim 6, wherein the historical information of an individual incoming emergency call includes one or more of a call frequency associated with a telephone number for the individual incoming emergency call and/or one or more emergency types based on previous emergency calls associated with a telephone number for the individual incoming emergency call.

8. The system of claim 1, wherein the geographical location information is obtained based on one or both of metadata associated with incoming emergency calls.

9. The system of claim 1, wherein the geographical location information is obtained based on one or both of global positioning system (GPS) information and/or information from one or more radio towers.

10. The system of claim 1, wherein determining the relative priority information includes:
   comparing the first geographical location of the first call and the second geographical location of the second call with one or more geographical locations associated with one or more current emergency events.

11. The system of claim 1, wherein the geographical location information is obtained before the incoming emergency calls are answered by the emergency call center.

12. A computer-implemented method for prioritizing incoming emergency calls to an emergency call center, the method being performed by one or more hardware processors configured by machine-readable instructions, the method comprising:
   obtaining geographical location information associated with incoming emergency calls such that a first geographical location is associated with a first call being placed to the emergency call center by a first caller and a second geographical location is associated with a second call being placed to the emergency call center by a second caller; and
   determining, responsive to the first call and the second call being placed to the emergency call center, relative priority information regarding the first call and the second call based on the first geographical location and the second geographical location;

wherein determining the relative priority information includes comparing the first geographical location of the first call and the second geographical location of the second call with one or more geographical locations associated with one or more emergency calls that (1) have been answered by the emergency call center and/or (2) are in the process of being answered by the emergency call center; and wherein an external database is queried, the database storing associations between telephone numbers and addresses.

13. The method of claim 12, further comprising:

presenting the first call and the second call to one or more emergency operators at the emergency call center in accordance with the determined relative priority information.

14. The method of claim 12, further comprising:

obtaining a first set of context information associated with the first call; and obtaining a second set of context information associated with the second call;

wherein the relative priority information is determined further based on the first set of context information and the second set of context information.

15. The method of claim 14, further comprising:

obtaining historical information associated with the incoming emergency calls such that, responsive to the first call and the second call being placed to the emergency call center, a first set of historical information is associated with the first call and a second set of historical information is associated with the second call;

wherein the first set of context information includes at least a portion of the first set of historical information, and wherein the second set of context information includes at least a portion of the second set of historical information.

16. The method of claim 15, wherein the first set of historical information includes one or more of a call frequency associated with a telephone number for the first call and/or one or more emergency types based on previous emergency calls associated with a telephone number for the first call.

17. The method of claim 12, wherein the first geographical location is obtained based on of metadata associated with the first call.

18. The method of claim 12, wherein the first geographical location is obtained based on one or both of global positioning system (GPS) information and/or information from one or more radio towers.

19. The method of claim 12, wherein the first set of context information includes information regarding proximity between the first geographical location and one or more of a geographical landmark, a road, a railroad, and/or bridge.

20. The method of claim 12, wherein the first set of context information includes information regarding proximity between the first caller and one or more of a geographical landmark, a road, a railroad, and/or a bridge.

21. The method of claim 12, wherein determining the relative priority information includes:

comparing the first geographical location of the first call and the second geographical location of the second call with one or more geographical locations associated with one or more current emergency events.

22. The method of claim 12, wherein the geographical location information is obtained before the incoming emergency calls are answered by the emergency call center.

* * * * *